United States Patent
Scales et al.

(10) Patent No.: US 8,166,475 B1
(45) Date of Patent: Apr. 24, 2012

(54) STORAGE AREA NETWORK ACCESS FOR VIRTUAL MACHINES

(75) Inventors: Daniel J. Scales, Mountain View, CA (US); Mallik Mahalingam, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 1301 days.

(21) Appl. No.: 11/478,200

(22) Filed: Jun. 29, 2006

Related U.S. Application Data

(60) Provisional application No. 60/756,321, filed on Dec. 30, 2005.

(51) Int. Cl.
G06F 9/445 (2006.01)
G06F 13/00 (2006.01)
G06F 15/173 (2006.01)

(52) U.S. Cl. .............................. 718/1; 711/114; 709/223

(58) Field of Classification Search ........ 718/1; 711/114; 709/223
See application file for complete search history.

(56) References Cited

U.S. PATENT DOCUMENTS

| | | | |
|---|---|---|---|
| 7,222,176 B1 * | 5/2007 | Laurent et al. | 709/226 |
| 7,606,986 B1 * | 10/2009 | Limaye et al. | 711/153 |
| 7,664,839 B1 * | 2/2010 | Karr et al. | 709/223 |
| 2003/0200247 A1 * | 10/2003 | Banzhaf et al. | 709/1 |
| 2005/0228835 A1 * | 10/2005 | Roa | 707/204 |
| 2007/0027973 A1 * | 2/2007 | Stein et al. | 709/223 |
| 2007/0079307 A1 * | 4/2007 | Dhawan et al. | 718/1 |
| 2007/0143497 A1 * | 6/2007 | Kottomtharayil et al. | 709/238 |

* cited by examiner

*Primary Examiner* — Kenneth Tang

(57) ABSTRACT

Detailed herein are approaches to allowing individual virtual machines executing on a single physical host to have their own substantially unique identifier for access to a storage area network (SAN). In one approach, a substantially unique identifier (SUI) is associated with a virtual machine, and the physical node is instructed to use that SUI when logging into the SAN and when performing input or output operations on behalf of the virtual machine.

27 Claims, 8 Drawing Sheets

Cluster 2000

SAN 2500

Flowchart 4000

Flowchart 7000

Flowchart 8000

STORAGE AREA NETWORK ACCESS FOR VIRTUAL MACHINES

CROSS-REFERENCE TO RELATED U.S. PROVISIONAL APPLICATION

This application claims priority of U.S. Provisional Patent Application Ser. No. 60/756,321 entitled "System and Method for Providing Per-Virtual-Machine Security While Maintaining Virtual Machine Portability," filed 30 Dec. 2005 which is herein incorporated by reference in its entirety.

BACKGROUND OF THE INVENTION

1. Field of the Invention

This invention relates to the field of virtual machine technology, and more specifically to the interaction of a virtual machine with a storage area network (SAN).

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include system hardware, that is, a hardware platform 100 of computer system 700, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU 210, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software 202 includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, ..., 210-m (VCPU0, VCPU1, VCPUm) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc.

If the VM 200 is properly designed, applications 260 running on the VM 200 will function as they would if run on a "real" computer, even though the applications are running at least partially indirectly, that is via the guest OS 220 and virtual processor(s) 210-0, 210-1, ..., 210-m. Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself.

Moreover, FIG. 1 shows virtual machine monitors that appear as separate entities from other components of the virtualization software. Furthermore, some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut.

The various virtualized hardware components in the VM, such as the virtual CPU(s) 210-0, 210-1, ..., 210-m, the virtual memory 230, the virtual disk 240, and the virtual device(s) 270, are shown as being part of the VM 200 for the sake of conceptual simplicity. In actuality, these "components" are usually implemented as software emulations 330 included in the VMM 300. One advantage of such an arrangement is that the VMM 300 may (but need not) be set up to expose "generic" devices, which facilitate VM migration and hardware platform-independence.

Different systems may implement virtualization to different degrees—"virtualization" generally relates to a spectrum of definitions rather than to a specific, discrete concept, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as possibly a Console Operating System 420, and any applications 430 running thereon. In some architectures, the Console Operating System 420 and Applications 430 are used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

Storage Area Networks and Virtual Machines

A storage area network, or SAN, is a network designed to attach data storage devices, such as disk arrays, to multiple computers. While many variations of SAN exist, most are implemented using low-level access methods. Most implementations of a SAN allow for restricting access to data stored on it, using a series of virtual partitions, identified by logical unit numbers (LUNs). Each LUN stored on a SAN can be associated with a particular computer, and other computers connected to the SAN do not need to see it. This association has traditionally been carried out by using a unique, or substantially unique, identifier for each computer connected to the SAN.

Because this unique identifier has traditionally been associated with the underlying hardware of the physical machine, complete utilization of a SAN by multiple virtual machines running on the same physical machine has been inhibited. In order for a virtual machine to access the SAN, by means of the virtualization software and the host node's hardware, the host node must be able to access any LUN used by any virtual machine running on the node. This behavior represents an inherent risk; any security problems or bugs that affect the node can compromise any, or every, LUN the node can access. Further, as portability is an important feature in virtual machines, if a virtual machine can be moved to any host within a cluster of nodes, and a virtual machine is to retain access to a LUN which it used in the past, then every node within the cluster needs to have access to that LUN.

SUMMARY OF THE INVENTION

Detailed herein are approaches to allowing individual virtual machines executing on a single physical host to have their own substantially unique identifier for access to a storage area network (SAN). In one approach, a substantially unique identifier (SUI) is associated with a virtual machine, and the physical node is instructed to use that SUI when logging into the SAN, and when performing input or output operations on behalf of the virtual machine.

Another approach, detailed below, involves a virtual machine cluster. The cluster includes a physical node, which hosts a plurality of virtual machines, a virtual machine management console, which creates and manages those virtual machines, and a storage area network. The virtual machine management console, when a VM is created, assigns an SUI to the virtual machine. The physical node then uses that SUI when accessing the SAN, and any particular logical unit number blocks (LUNs) associated with that virtual machine.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION

Figure 1:
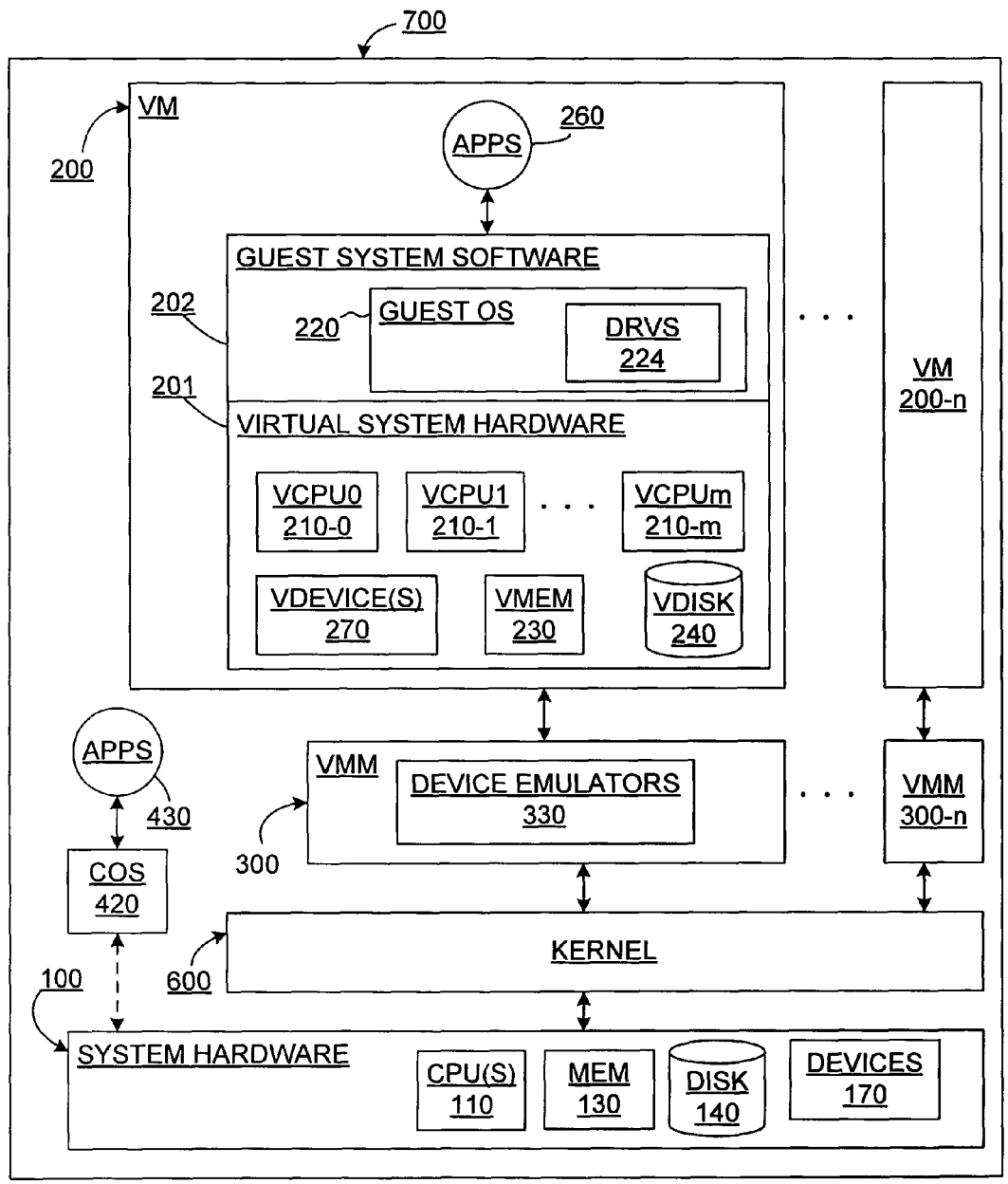
FIG. 1 is a diagram of an exemplary virtualized computer system with which embodiments of the present technology may be practiced.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 6) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout this patent, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

It is understood that the following embodiments are exemplary in nature. Embodiments of the present invention are well suited to application across a wide range of computers, virtual systems, networks, and storage protocols. Embodiments of the present invention may be used in both hosted and non-hosted virtualized computer systems, and regardless of the degree of virtualization and the systems. Embodiments may be used in applications in which the virtual machines have any number of physical and/or logical virtualized processors. Embodiments of the present invention may be implemented in numerous locations, including as part of a computer system's primary operating system, both where the OS is designed to support virtual machines, and where it is not. Additionally, embodiments of the present invention may be implemented in software, in hardware, or in some combination thereof, e.g., in processor architectures intended to provide hardware support for virtual machines.

Virtual Machine Clusters and Storage Area Networks (SANs)

Virtual machines are often deployed in a cluster. Multiple virtual machines can be run on a single physical machine, or node, and multiple nodes can be grouped together for more efficient utilization of shared resources, such as a SAN. Often, a cluster may be managed via a virtual machine management console. A VM management console can allow for a centralized access point for VM creation, deletion, migration, and management across the cluster. Often, the VM management console also includes tools for managing the cluster's shared resources.

Figure 2:
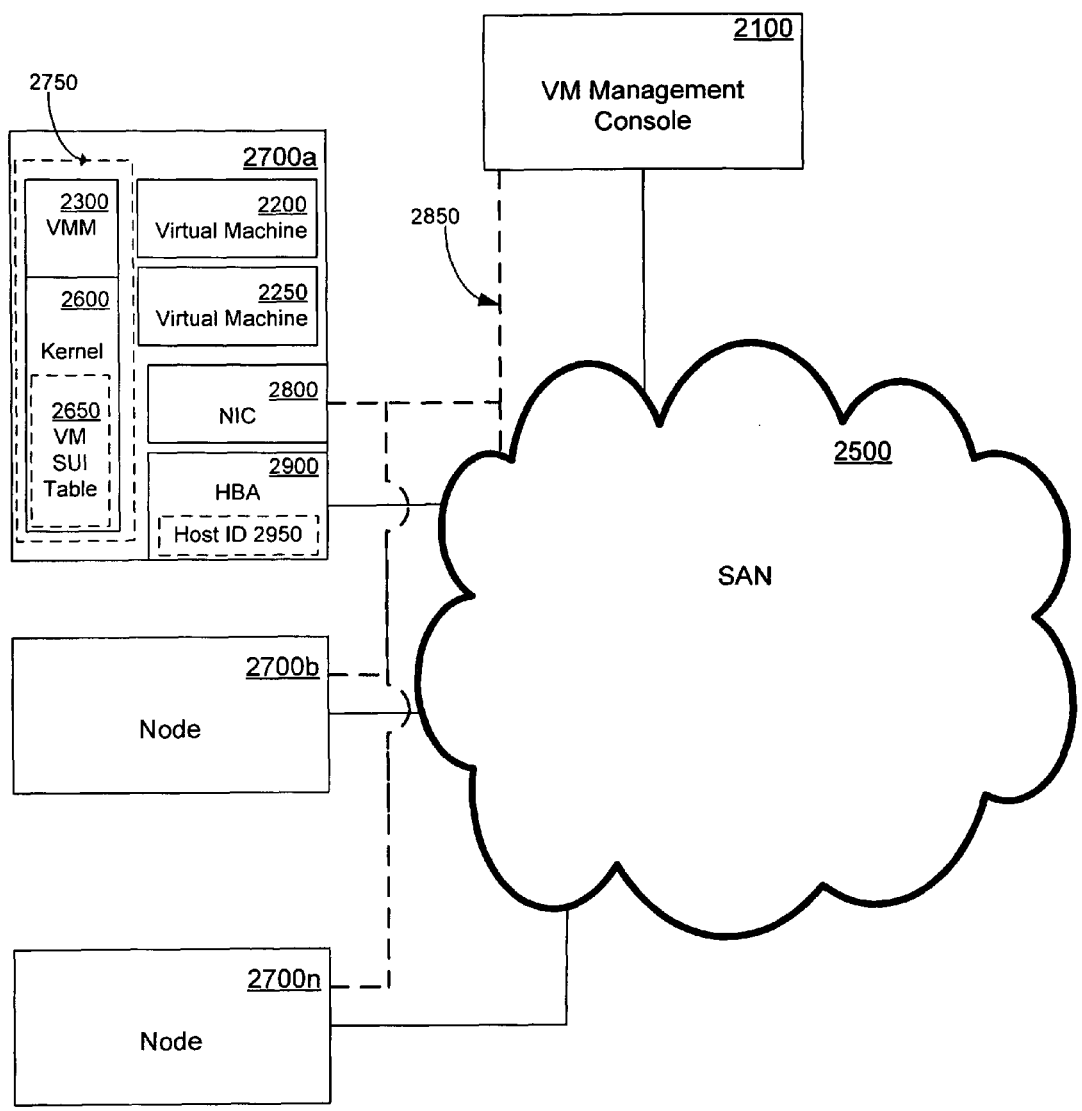
FIG. 2 depicts a virtual machine cluster, upon which embodiments of the present invention may be implemented.

With reference now to FIG. 2, a virtual machine cluster 2000 is depicted, upon which embodiments of the present invention may be practiced. While virtual machine cluster 2000 is shown as including discrete, enumerated components, it is understood that this depiction is exemplary only. Embodiments of the present invention are well suited for applications incorporating additional, fewer, or different components than those shown.

VM cluster 2000 is shown as incorporating a number of nodes 2700a through 2700n. In some embodiments, each such node may be running one or more virtual machines, such as virtual machines 2200 and 2250. Each node also includes virtualization software, such as virtualization software 2750. As depicted, virtualization software 2750 incorporates virtual machine monitor (VMM) 2300, and kernel 2600. This virtualization software provides an interface between the hardware of the node, and the virtual machines running on it.

Kernel 2600 is shown as including VM SUI module 2650. As is explained in greater detail below, VM SUI module 2650 is used to store substantially unique identifiers relating to the virtual machines running on the node.

Each node, in the depicted embodiment, includes a host bus adapter (HBA), such as HBA 2900. HBA 2900 includes host SUI 2950. As is explained in more detail below, host SUI 2950 identifies node 2700a, for purposes of access to a SAN. Many options exist, when selecting a SAN; the type of SAN utilized in VM cluster 2000 will influence which host bus adapter to use.

VM cluster 2000 includes virtual machine management console 2100. VM management console 2100 can be used to manage each of the nodes in VM cluster 2000, as well as virtual machines running on each node. VM management console 2100 can also be used, in some embodiments, to manage the SAN.

VM cluster 2000 is shown as including SAN 2500. SAN 2500 is available to the nodes in VM cluster 2000, and provides data storage capability. Many types of SAN are known, and are suitable for use with embodiments of the present invention. Popular choices include Fibre Channel networking, which uses the SCSI command set, as well as the iSCSI protocol, which also uses the SCSI command set, but is implemented over TCP/IP, rather than requiring Fibre Channel.

In some embodiments, such as VM cluster 2000, a separate network 2850 may be used for network traffic unrelated to SAN access, e.g., each node may have a separate ethernet adapter, such as network interface card (NIC) 2800, to allow ethernet access, as well as a Fibre Channel HBA for SAN access. In other embodiments, communication between nodes and/or VM management console 2100 occurs via SAN 2500.

LUN Masking and Substantially Unique Identifiers (SUIs)

Figure 3:
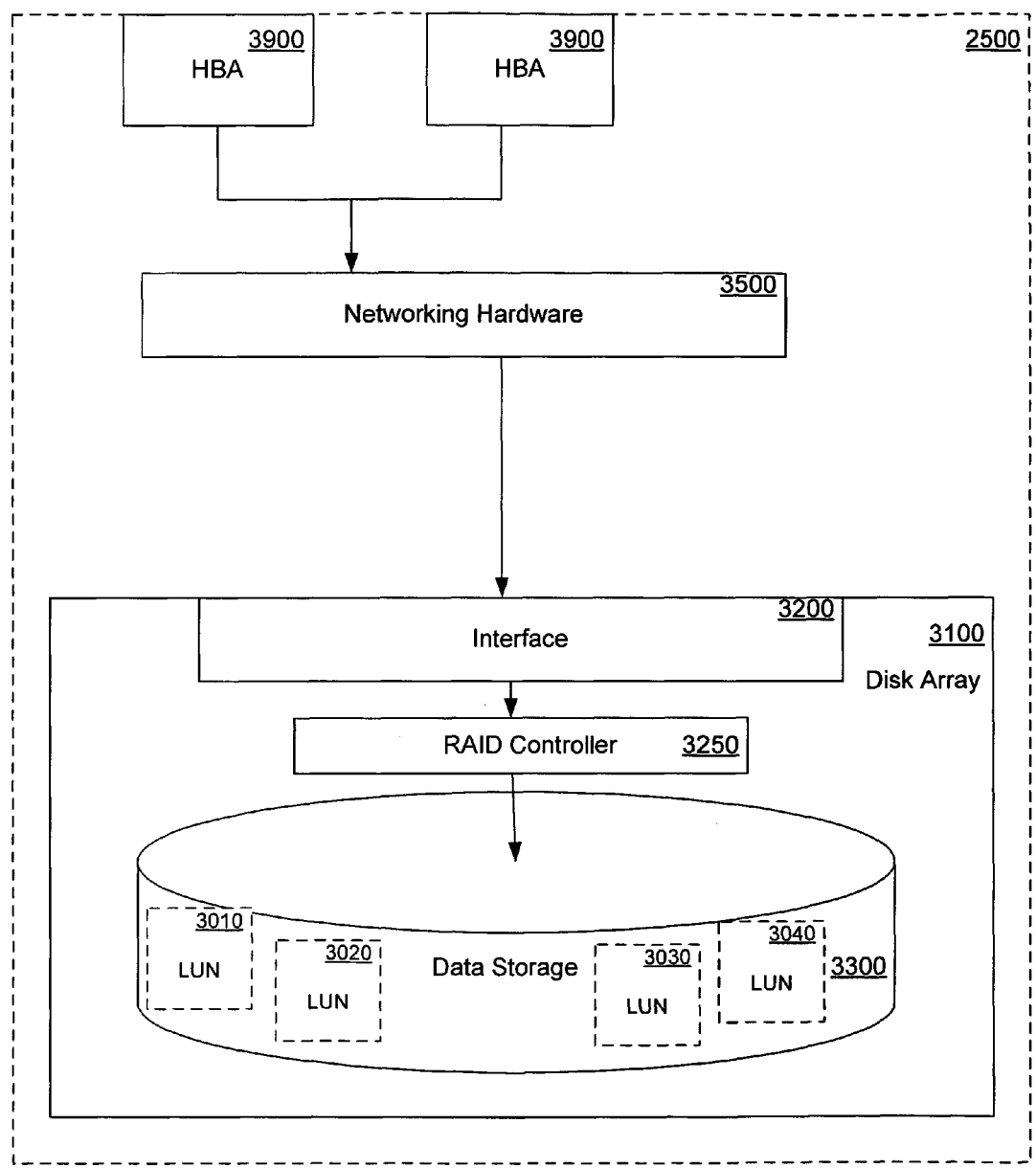
FIG. 3 depicts a block diagram of a storage area network (SAN), upon which embodiments of the present invention may be implemented.

With reference now to FIG. 3, a block diagram of a SAN 2500 is depicted, upon which embodiments of the present invention may be implemented. While SAN 2500 is shown as including discrete, enumerated components, it is understood that this depiction is exemplary only. Embodiments of the present invention are well suited for applications incorporating additional, fewer, or different components than those shown.

SAN 2500 is shown as including a disk array 3100. Disk array 3100 includes an interface 3200, through which the data is transferred. Disk array 3100 also includes a data store 3300, for storing data. The nature of data store 3300 will change, in different embodiments. In some embodiments, for example, multiple discrete disks are arranged in a redundant array of independent disks (RAID array). Such embodiments may include a RAID controller 3250.

Data store 3300 is shown as being divided into multiple virtual partitions, or LUNs, such as LUN 3010, 3020, 3030, and 3040. Such virtual partitioning is common in disk arrays, as it allows different computers to have their own, discreet storage space on the disk arrays. This is achieved through a process called LUN masking. In some embodiments, interface 3200 or RAID controller 3250 implements LUN masking, and restricts access to LUNs stored on disk array 3100.

LUN masking involves associating an identifier with both a computer and a LUN. The exact nature of the identifier will vary, depending on what type of SAN is in use. For example, in a Fibre Channel SAN, each computer will have an associated worldwide name (WWN), while in an iSCSI environment, each system has an iSCSI initiator name. Traditionally, these identifiers were actually associated with the host bus adapter (HBA) in a computer or node. LUN masking takes these identifiers, and associates them with LUNs on the SAN, such that a node can only access a LUN, if it has the appropriate identifier. For example, with reference to FIGS. 2 and 3, node 2700a would only be allowed to access LUN 3010 if host SUI 2950 was associated with LUN 3010.

Other, similar, data segregation schemes exist, e.g., zoning. While this discussion uses LUNs and LUN masking to illustrate several embodiments of the present invention, it is understood that other embodiments extend to such other schemes as well.

Previously, the identifier for a host bus adapter was hard-coded, and could not change. More recently, host bus adapters have been created which allow for dynamic reconfiguration of this identifier. Embodiments of the present invention take advantage of this development, in order to allow each virtual machine to have its own substantially unique identifier (SUI), as is explained in greater detail, below.

By assigning each VM an SUI, embodiments of the present invention allow LUN masking to be performed in such a way as to allocate LUNs per VM, rather than per physical node. This offers several benefits. For example, unlike in the prior art, every VM on a given node will not have access to a LUN via LUN masking. Additionally, portability of the VM is improved, as the LUN is now associated with a particular VM, rather than a physical host. Where, previously, every host in the cluster would need access to a LUN, in order to assure that a VM could be migrated successfully to any host, now only the VM needs access to the LUN.

Assigning SUIs

In some embodiments, in order to avoid potential conflicts, each device connected to a SAN needs a different SUI. In these embodiments, at any given instant, no duplicate SUIs should be in use. This is achieved, in different embodiments, in many different ways.

In some embodiments, substantially unique identifiers are generated using a combination of variables. For example, combining the IP address of the physical node with the current timestamp, plus the combination of some random element, will yield an SUI that is reasonably unlikely to be identical to any other SUI in use for that SAN. Other approaches, using other factors and elements, to generate SUIs are equally valid.

In several embodiments, SUI's are generated at the time they are needed, e.g., a new SUI is generated when a new virtual machine is created. In other embodiments, SUI's are pregenerated. This approach is valuable, in that LUNs may then be pre-masked; when a new virtual machine is created, both an SUI and an associated LUN are already available to be linked to that VM.

In some embodiments, a pool of reusable SUI's is used. In several such embodiments, an SUI is "checked out" when a new virtual machine needs it, e.g., at creation. When the VM no longer requires the SUI, e.g., at VM deletion, that SUI can be "checked in" as being once again available for use. Using such a pool, in some embodiments, allows for easily recyclable access to LUNs masked to SUI's in that pool.

In some embodiments, where LUN masking is not used in conjunction with a SAN, SUI's could be assigned completely randomly. In several such embodiments, while all available portions of the disk array would need to be accessible to any SUI, these embodiments would still allow for viewing of I/O activity for any particular virtual machine.

Virtual Machine Creation and SUIs

In some embodiments, virtual machines are created by a VM management console. This console may use a template to create the VM, depending on the desired nature of the VM. The "identity" of a VM is stored in a VM configuration (config) file; some embodiments of the present invention expand this config file to include an SUI. In several such embodiments, the SUI is attached to the VM at the time of creation. In other embodiments, the SUI is associated with the VM at a later time, e.g., prior to the first "power on" cycle for the VM.

Figure 4:
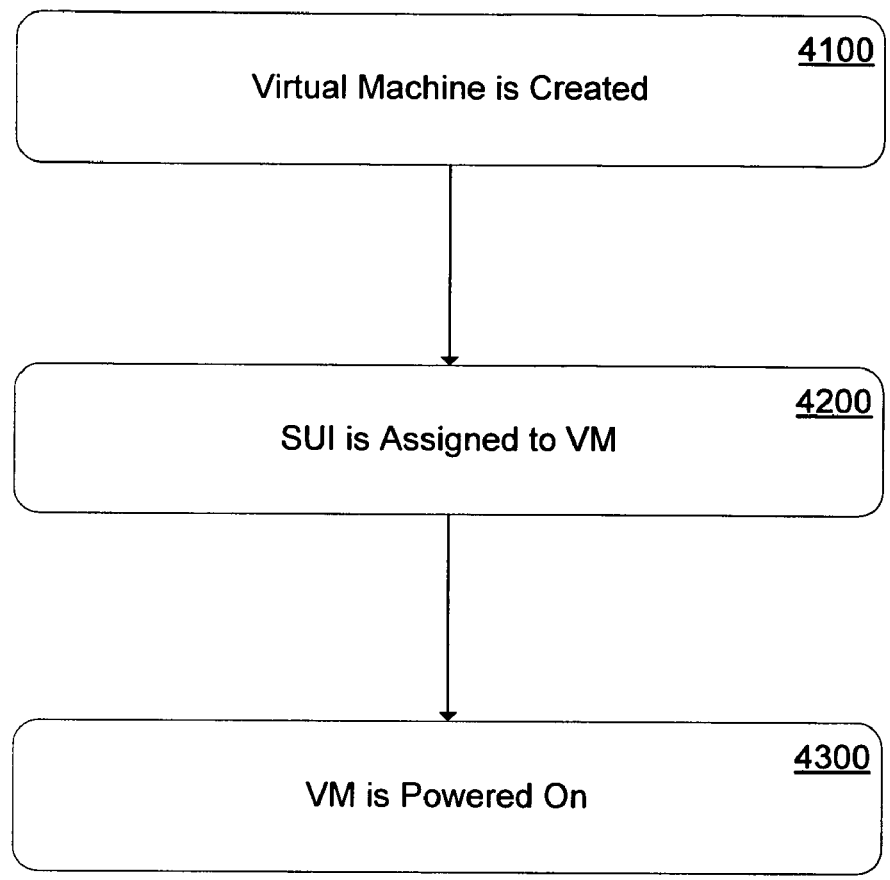
FIG. 4 depicts a flowchart of a method of assigning a substantially unique identifier (SUI) to a virtual machine, in accordance with one embodiment of the present invention.

With reference now to FIG. 4, a flowchart 4000 of a method of assigning a SUI to a VM is depicted, in accordance with one embodiment of the present invention. Although specific steps are disclosed in flowchart 4000, such steps are exemplary. That is, embodiments of the present invention are well suited to performing various other (additional) steps or variations of the steps recited in flowchart 4000. It is appreciated that the steps in flowchart 4000 may be performed in an order different than presented, and that not all of the steps in flowchart 4000 may be performed.

With reference now to step 4100 and FIG. 2, a virtual machine is created. In some embodiments, the virtual machine is created by a virtual machine management console, such as VM management console 2100. In other embodiments, the virtual machine is created by other means. For example, in some embodiments, software running on the host node allows for the creation of a virtual machine. In many embodiments, virtual machine creation includes creating a VM configuration file. This VM configuration file may be stored in some local storage, or available via the SAN, e.g., in a LUN accessible to nodes in a cluster where the VM will eventually be run. In other embodiments, the VM configuration file is stored in alternative locations.

With reference now to step 4200 and FIG. 2, a substantially unique identifier (SUI) is associated with the virtual machine. As described above, this SUI may be created in many different ways, and at many different times. In some embodiments, assigning an SUI to a VM is done at the time of VM creation. In other embodiments, this association is done later, e.g., before powering on the VM for the first time. In some embodiments, the SUI assigned to the VM is included as part of the VM configuration file. For example, when VM management console 2100 creates virtual machine 2200, an SUI is assigned to identify VM 2200.

With reference now to step 4300 and FIG. 2, the virtual machine is powered on. In some embodiments, when a virtual machine is first powered up on a new host, the SUI associated with that virtual machine is stored by the host. For example, when VM 2200 is first powered up on host 2700a, the SUI for VM 2200, which is stored in the configuration file for VM 2200, is loaded into VM SUI table 2650. In other embodiments, the host retrieves this information at some other time, e.g., when a virtual machine is first loaded onto the host. In some embodiments, this step is omitted.

Behavior of the Host Node

In some embodiments of the present invention, the behavior of the virtual machine itself has not been altered. In these embodiments, the virtual machine has not been configured to expect access to a SAN; rather, the virtual machine continues to operate with the same understanding of the virtual system hardware, e.g., virtual system hardware 201, as in prior art implementations of virtual machines. In these embodiments, the host node, and the virtualization software executing on the host node, provide for SAN access, as well as dealing with SUIs as necessary.

Figure 5:
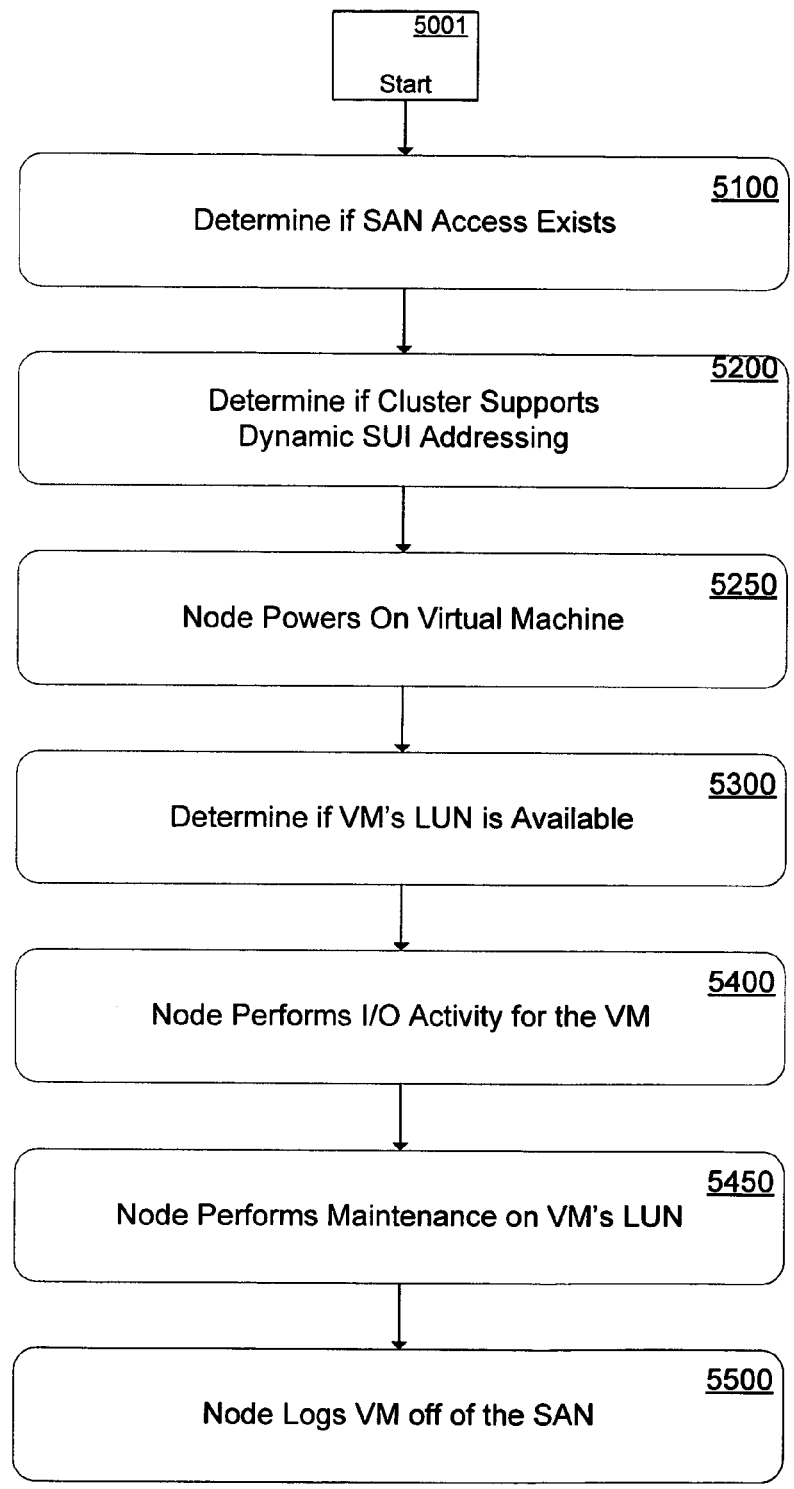
FIG. 5 depicts a flowchart of a method of node operation, in accordance with one embodiment of the present invention.

With reference now to FIG. 5, a flowchart 5000 of a method of node operation is depicted, in accordance with one embodiment of the present invention. Although specific steps are disclosed in flowchart 5000, such steps are exemplary. That is, embodiments of the present invention are well suited to performing various other (additional) steps or variations of the steps recited in flowchart 5000. It is appreciated that the steps in flowchart 5000 may be performed in an order different than presented, and that not all of the steps in flowchart 5000 may be performed. Furthermore, while the method depicted in flowchart 5000 describes the behavior of the host node, it is understood that in other embodiments, these actions may be performed by other entities, hardware or software.

With reference now to step 5001 and FIG. 2, the method begins. In some embodiments, the method assumes that a virtual machine has been loaded into the node, and has an associated SUI. For example, virtual machine 2200 has been loaded into node 2700a, and has an associated SUI stored in VM SUI table 2650. In other embodiments, different assumptions regarding the start condition are made.

With reference now to step 5100 and FIG. 2, the node determines whether access to a SAN exists. For example, node 2700a determines whether a SAN adapter, such as HBA 2900, is available. Further, in some embodiments, node 2700*a* also attempts to contact SAN 2500, to verify a connection via the network. In some embodiments, the step is performed frequently, e.g., upon power on of any virtual machine on the node. Checking for SAN access frequently, in these embodiments, helps ensure that a virtual machine is not started, if the resources necessary for it to run are not available.

With reference now to step 5200 and FIG. 2, the node determines whether the cluster supports dynamic SUI assignment. In different cluster configurations, in different embodiments, the requirements of this step will vary. For instance, it may be necessary to determine whether the HBA, the switches, and/or the network itself allows for the SUI used to identify the node to change during the course of operations. For example, node 2700*a* queries HBA 2900, to determine whether HBA 2900 allows for multiple SUIs and dynamic SUI assignment. In some embodiments, this step is performed frequently, e.g., upon power on of any virtual machine on the node. In some of these embodiments, the state of the network, the cluster, and even the node hardware may change while the node is operating.

With reference now to step 5250 and FIG. 2, the node begins to power on the virtual machine. For example, node 2700*a* begins powering on virtual machine 2200. In some embodiments, the step runs before, or concurrently with, steps 5100 and 5200. In these embodiments, checking the availability of the SAN, and the support for dynamic SUI alteration, is done as part of the power on process for the virtual machine. In other embodiments, e.g., embodiments where checking for SAN availability and/or dynamic SUI alteration capability is not performed during every virtual machine power on, this step may come substantially after the preceding steps. In other embodiments, the method begins with the step, and the preceding steps are omitted.

With reference now to step 5300 and FIG. 2, the node determines whether a LUN associated with the virtual machine is currently available. In some embodiments, this requires the host node to use the SUI associated with the virtual machine. In several such embodiments, the host node does not ordinarily have access to the LUN associated with the virtual machine. As such, if the host node is to determine the availability of such a LUN, the host node may need to use the VM's SUI. For example, if VM 2200 has an associated LUN, e.g., LUN 3010, stored in SAN 2500, node 2700*a* may need to retrieve the SUI associated with VM 2200 from VM SUI table 2650. Node 2700*a* would use this SUI to access SAN 2500, rather than using host SUI 2950.

In some embodiments, the step also includes retrieving a "handle" from the SAN, which can then be used to access the LUN. In some embodiments, this handle serves as a shorthand reference mechanism for the SUI used to access the LUN. In future interactions with the SAN regarding that particular SUI, such as the node performing I/O activity for the virtual machine, the handle can be used. For example, after node 2700*a* used the SUI associated with VM 2200 to access SAN 2500, SAN 2500 can return a handle. This handle, which can be stored in, for example, VM SUI table 2650, will be used by node 2700*a* in future interactions with SAN 2500 for VM 2200.

With reference now to step 5400 and FIG. 2, the node performs I/O activity for the virtual machine. For example, node 2700*a*, in response to the activity of VM 2200, will transmit I/O requests via HBA 2900 to SAN 2500, and any LUN associated with virtual machine 2200. In some embodiments, as noted above, a handle is used for these interactions.

In other embodiments, the SUI associated with VM 2200 in VM SUI table 2650 is used in order to access any LUN associated with VM 2200.

With reference now to step 5450 and FIG. 2, in some embodiments, the node performs maintenance activities on the LUN associated with the virtual machine, using the identity of the virtual machine. While a virtual machine is running, it is sometimes necessary for the host node itself to access the LUN associated with the virtual machine. For example, if a file system exists on the LUN, the node may need to perform some basic file system actions. In order to carry out this activity, the node needs to use an SUI or handle that allows access to the LUN. For instance, if a file system exists on LUN 3010, which is associated with VM 2200, and VM management console 2100 requests information on that file system, node 2700*a* will need to access LUN 3010 using the SUI or handle associated with VM 2200.

With reference now to step 5500 and FIG. 2, the node logs the VM off of the SAN. This step occurs under different circumstances in different embodiments. For example, when a VM is powered off, a process likely to occur often over the life of a VM, the node should log it off of the SAN. When a VM is destroyed or deleted, it should also be logged off of the SAN. In some embodiments, the logoff is accomplished using the SUI associated with the VM. In other embodiments, the logoff is accomplished using the handle provided by the SAN. In some embodiments, including several in which SUIs are reused within the cluster, when a VM is destroyed, the logoff procedure includes releasing the SUI, making it available for future use. For example, when VM 2200 is powered off and deleted, node 2700*a* uses the handle associated with VM 2200 and provided by SAN 2500 to log off of SAN 2500. Node 2700*a* may also release the SUI associated with VM 2200, e.g., by contacting VM management console 2100, and may purge the data associated with VM 2200 from VM SUI table 2650.

Host nodes, or virtual machine management software, which implement embodiments of the above described method offer several advantages. First, in some embodiments, the host node assumes the task of determining whether a SAN is available, and if dynamic SUI assignment can be used. This allows virtual machines to continue to be crafted as simply as possible, to support the lowest common hardware requirements. This allows virtual machines to run on more platforms, which facilitates portability.

Additionally, in some embodiments, portability is also enhanced by allowing the host node, which of itself has no access to a LUN associated with the virtual machine, to use the virtual machine's SUI to access the LUN. Rather than having to allow every physical node in a cluster access to every single LUN, LUN access can be handled dynamically, as virtual machines are started and stopped on different physical hosts.

Also, the disk arrays can report statistics on an SUI basis. By using a different SUI for each VM, disk array software tools can readily identify activity by individual VMs, and provide statistics on the resource usage per VM.

Further, in some embodiments, the use of the virtual machine's SUI to access the LUN ensures that every physical host in the cluster could perform necessary maintenance activities on the LUN, if the virtual machine is running on that node. When the virtual machine is running on a given node, that node has access to the VM's SUI and/or handle. Using the SUI or handle, the node can access the VM's LUN, and carry out any necessary task. This topic is explored in greater depth below, with reference to FIG. 6.

Finally, this approach also allows better bandwidth control for each VM. The use of different SUIs allows Fibre Channel switches and disk arrays, for example, to distinguish the bandwidth being used by different virtual machines. In some embodiments, several VMs could also be grouped, for example, by physical node, into a single bandwidth group, e.g., by tagging all their I/O with the same SUI, rather than different SUIs.

VM-Specific SUIs and VM Migration

One feature of some virtual machines is their portability. A virtual machine need not be specific to the underlying hardware of its host computer; it can be moved from one node to another, even if the two nodes are not identical. This process is sometimes referred to as VM migration.

Two types of migration are common. The first, sometimes called cold migration, simply involves taking a virtual machine that is presently powered off from one node, and moving it to another. The second type of migration, sometimes called hot migration, involves moving a virtual machine that is presently powered on and running from one node to another. In many cases, hot migration is accomplished by shutting down the operating virtual machine, while preserving its memory and device state, moving it to its new host, and powering it back on and restoring its state.

Where a SAN is involved, the prior art approach to LUN access and migration required that both the old node and the new node, or more specifically, their respective host SUIs, have access to any LUN on the SAN associated with any virtual machine that was to be migrated between them. If a virtual machine, with an associated LUN, was to be portable between the two nodes, then it would need to be able to access that LUN from either of the nodes. As such, either the LUN masking would have to be updated every time a virtual machine was migrated, or else the LUN masking would have to already be set to allow access by both nodes.

Embodiments of the present invention allow for nodes to dynamically gain access to the LUN as necessary, and without the need to constantly alter the LUN masking. Rather than granting physical nodes access to a LUN, e.g., by updating the LUN masking to allow those host SUIs to see a LUN, only the virtual machine's SUI needs to be masked to have access to the LUN. The physical node, when it needs to see the LUN, can then borrow the VM's SUI.

Figure 6:
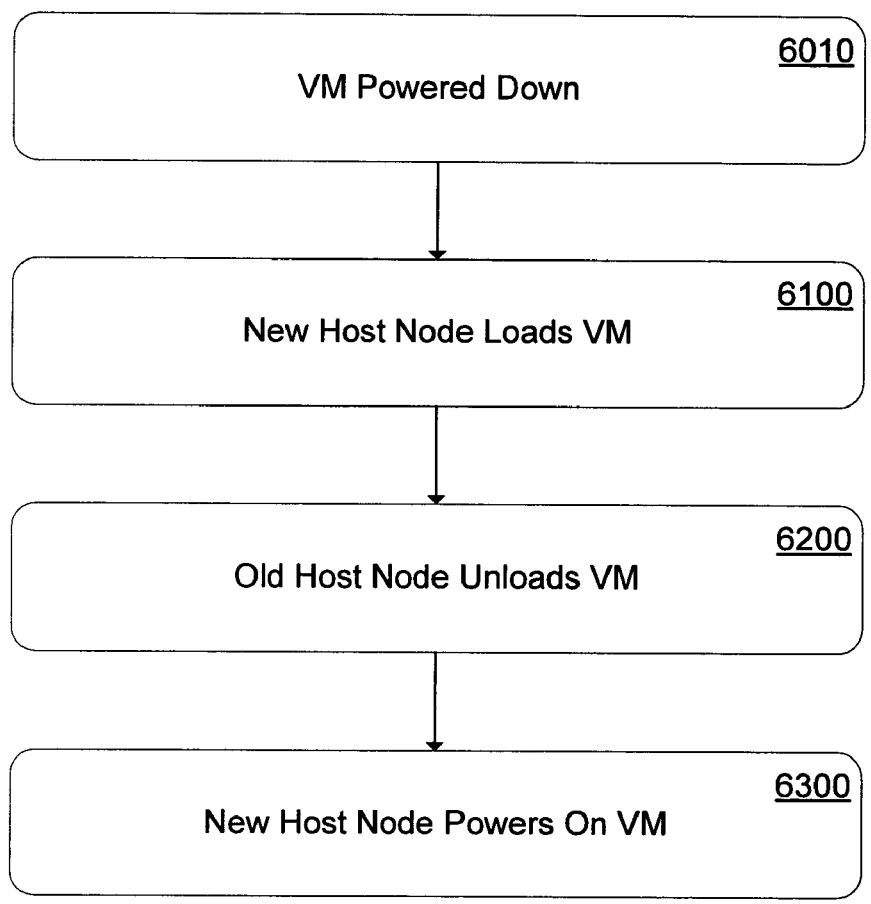
FIG. 6 depicts a method of virtual machine migration, in accordance with one embodiment of the present invention.

With reference now to FIG. 6, a flowchart 6000 of a method of virtual machine migration is depicted, in accordance with one embodiment of the present invention. Although specific steps are disclosed in flowchart 6000, such steps are exemplary. That is, embodiments of the present invention are well suited to performing various other (additional) steps or variations of the steps recited in flowchart 6000. It is appreciated that the steps in flowchart 6000 may be performed in an order different than presented, and that not all of the steps in flowchart 6000 may be performed.

With reference now to Step 6010 and FIGS. 2 and 3, a virtual machine is powered down on a physical node. In a cold migration situation, in some embodiments, the step may precede the following steps by some length of time. In a hot migration situation, in some embodiments, the step may occur immediately before the following steps. In addition, in a hot migration, the current memory and device state of the VM is preserved before powering off the VM. In some embodiments, e.g., several in which a virtual machine was moved to a physical node but never powered on before being migrated again, the step can be omitted. The process involved in shutting down a virtual machine is well known in the art. For example, if VM 2200 was to be migrated from node 2700a to node 2700b, the state of any virtual processors and any virtual memory associated with VM 2200 would be stored, e.g., in a location available to both node 2700a and node 2700b such as in a shared LUN on SAN 2500; also, the virtual machine configuration file for VM 2200, which may also be stored on SAN 2500, may need to be updated.

With reference now to step 6100 and FIGS. 2 and 3, the new host node loads the virtual machine. In some embodiments, a virtual machine is loaded into a host node by reading in data from an associated virtual machine configuration file. In a migration situation, this process includes returning virtual components to the state they were in at the time the virtual machine is powered off. For example, node 2700b reads in the virtual machine configuration file for VM 2200 from a LUN shared with node 2700a, and restores the state of VM 2200's virtual processors and virtual memory to the state it was in when it was shut down on node 2200a.

With reference now to step 6200 and FIGS. 2 and 3, the old host node unloads the virtual machine. In some embodiments, the step may precede step 6100, e.g., to avoid conflicts. In other embodiments, the step follows step 6100, e.g., to ensure that the virtual machine can be loaded on its new host before it is removed from the old. In some embodiments, unloading the virtual machine involves deleting a software construct. In further embodiments, the old node also updates a virtual machine SUI table, to remove the SUI associated with the virtual machine.

In several such embodiments, upon successful unloading of the virtual machine and updating of the VM SUI table, the old node no longer has the ability to access the VM's LUN. For example, if VM 2200 is associated with LUN 3010, after VM 2200 is removed from node 2700a, and VM SUI table 2650 is updated, node 2700a is no longer able to access the LUN 3010.

With reference now to step 6300 and FIGS. 2 and 3, the new host node powers on the virtual machine. As with step 6010, when, or if, this step occurs will vary across different embodiments. In a cold migration situation, in some embodiments, a substantial length of time may elapse between loading of a virtual machine on to a new node and powering it up. In a hot migration situation, in some embodiments, a virtual machine may be powered up as soon as it has been loaded. In some embodiments, the virtual machine may never be powered on, before it is deleted or migrated to another new host.

In several embodiments, when the host node powers on the virtual machine, the SUI associated with that virtual machine is loaded into the new host, e.g., in the new host's VM SUI table. In other embodiments, the SUI associated with that virtual machine was loaded during step 6100. In many embodiments, only after the SUI associated with that virtual machine has been loaded, can the new host node access the LUN associated with the virtual machine. For example, after virtual machine 2200 has been loaded onto node 2700b, and the SUI associated with virtual machine 2200 has been loaded into node 2700b's VM SUI table, node 2700b can access LUN 3010.

SAN and LUN Access by a Host Node

A host node, particularly one with multiple virtual machines running on it, may need to access an attached SAN frequently. Several VMs running on the node may need to perform I/O operations that require access to the SAN, or the node itself may need to access some data residing in a LUN associated with the host, or available to multiple nodes in the cluster. Embodiments of the present invention address this problem through the use of dynamically configurable HBAs.

Figure 7:
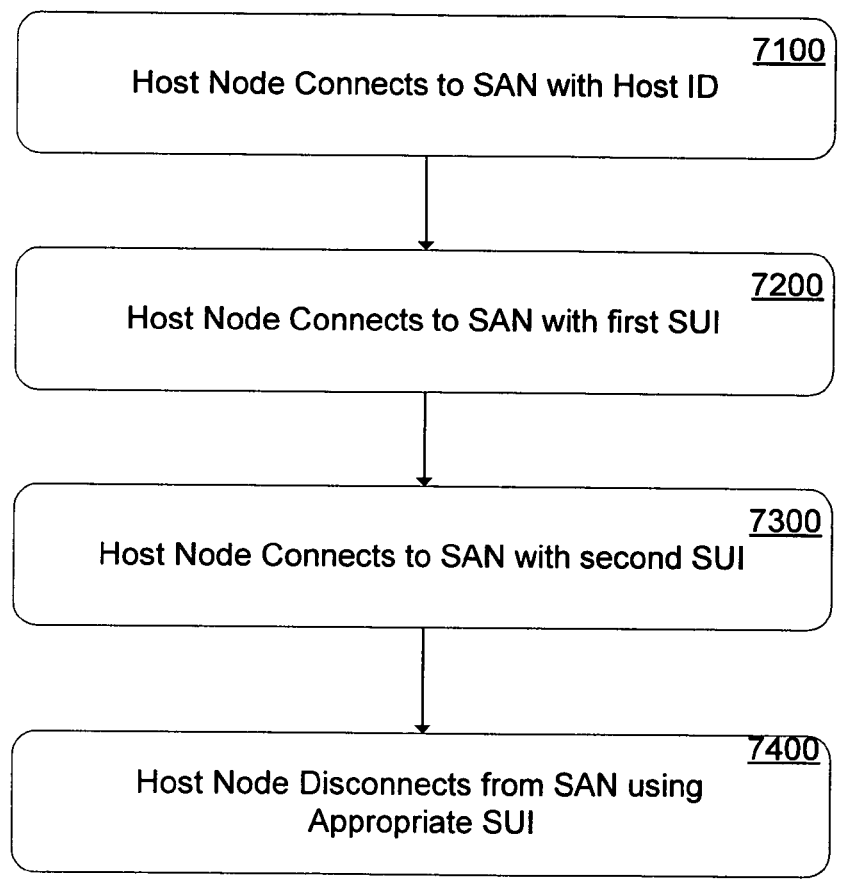
FIG. 7 depicts a method of allowing a host node to access a storage area network (SAN), in accordance with one embodiment of the present invention.

With reference now to FIG. 7, a flowchart 7000 of a method of allowing a host node to access a SAN is presented, in accordance with one embodiment of the present invention.

Although specific steps are disclosed in flowchart 7000, such steps are exemplary. That is, embodiments of the present invention are well suited to performing various other (additional) steps or variations of the steps recited in flowchart 7000. It is appreciated that the steps in flowchart 7000 may be performed in an order different than presented, and that not all of the steps in flowchart 7000 may be performed.

With reference now to step 7100 and FIG. 2, a host node accesses a SAN, using a host SUI associated with the host node. In some embodiments, the host node logs into a SAN, and identifies itself using an identifier that is specific to the host node itself, e.g., a WWN associated with the HBA of the host node. In other embodiments, the host SUI is also configurable; in several such embodiments, a cluster management tool for an administrator can assign a host SUI to a physical node. Further, in some embodiments, the SAN provides a handle to the host node, which the host node will use for further access to the SAN. For example, node 2700a connects to SAN 2500, using the host SUI 2950, which is unique to HBA 7900. SAN 2500 provides node 2700a a software handle to use to access the SAN. Node 2700a will use that handle for any additional SAN access needed by the node itself.

With reference now to step 7200 and FIG. 2, the host node connects to the SAN, using an SUI associated with a first virtual machine. In some embodiments, including several where the HBA, network, and SAN support multiple addresses for a single physical machine, the host node can use an SUI associated with one of its virtual machines to log into the SAN. This allows the host node to perform I/O actions and other tasks, as if the host node's host SUI was the same as the virtual machine's SUI. In such embodiments, the HBA of the physical node can be dynamically configured, to transmit a different identifier, e.g., the VM's SUI, in place of the host's identifier, e.g., the host SUI. In some embodiments, once connected, the SAN provides the host node with a first VM handle, to use when accessing the SAN as the first virtual machine. For example, when virtual machine 2200 performs an action that requires access to a LUN stored on SAN 2500, node 2700a can configure HBA 2900 to use an SUI associated with virtual machine 2200, and stored in VM SUI table 2650, rather than connecting to SAN 2500 using host SUI 2950.

With reference now to step 7300 and FIG. 2, the host node connects to the SAN, using an SUI associated with a second virtual machine. In some embodiments, once connected, the SAN provides the host node with a handle, to use when accessing the SAN as the second virtual machine. For example, when virtual machine 2250 performs an action that requires access to a LUN stored on SAN 2500, node 2700a can configure HBA 2900 to use an SUI associated with virtual machine 2250, and stored in VM SUI table 2650, rather than connecting to SAN 2500 using host SUI 2950.

With reference now to step 7400 and FIG. 2, the host node disconnects from the SAN, using the appropriate SUI or handle. In some embodiments, a VM may no longer require access to the SAN, e.g., when the VM is powered down. Using the SUI and/or handle associated with the VM that is being powered down, the host node can log that VM off of the SAN. For example, node 2700a logs out of SAN 2500, using either the SUI for VM 2250, or a handle provided by SAN 2500 when VM 2250 was logged into the SAN.

Pre-Generation of SUIs and LUN Masking

In some embodiments, an SUI can be pregenerated, and LUN masking can then be performed, before a virtual machine is created that needs the SUI. This can be particularly advantageous, for example, in a cluster where numerous virtual machines are created with similar needs, as regards access to the SAN. In such a situation, a virtual machine management console, or other entity, can be used to create a list of appropriate SUIs. Once an SUI is created, LUN masking can be performed to allow a virtual machine using that SUI to access the SAN. When a new virtual machine is created, an entry from this list is ready for immediate assignment, with the LUN masking already in place to allow appropriate access.

In some embodiments, this idea is extended, to include reusing SUIs. When an SUI is no longer needed, e.g., because the virtual machine it was associated with has been deleted, that SUI can be returned to a "pool" of available SUIs for that cluster. When another virtual machine is created, which requires an SUI and similar SAN access as the previously-deleted virtual machine, the SUI can be drawn out of the pool and associated with the new virtual machine. The LUN masking necessary for the virtual machine to access the SAN is already in place.

Figure 8:
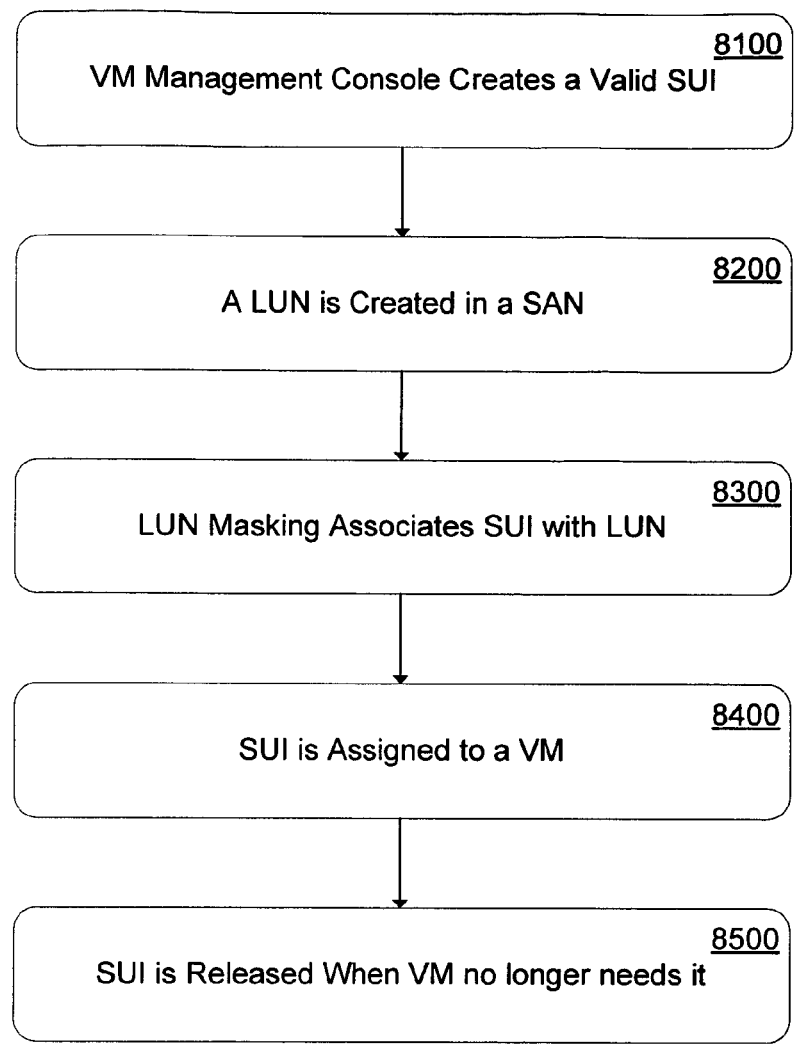
FIG. 8 depicts a flowchart of a method of generating a substantially unique identifier (SUI) and performing LUN masking, in accordance with one embodiment of the present invention.

With reference now to FIG. 8, a flowchart 8000 of a method of generating an SUI and performing LUN masking is depicted, in accordance with one embodiment of the present invention. Although specific steps are disclosed in flowchart 8000, such steps are exemplary. That is, embodiments of the present invention are well suited to performing various other (additional) steps or variations of the steps recited in flowchart 8000. It is appreciated that the steps in flowchart 8000 may be performed in an order different than presented, and that not all of the steps in flowchart 8000 may be performed.

With reference to step 8100 and FIG. 3, a virtual machine management console creates one or more valid SUIs. While this step, and flowchart 8000, specify action by a virtual machine management console, it is understood that embodiments of the present invention are well suited to being carried out by other entities. For example, in some embodiments, the steps can be performed by a physical node, rather than by a cluster wide management system.

The method of SUI generation utilized in this step will vary across different embodiments. In some embodiments, an SUI should be generated in a way that provides a reasonable expectation that no duplication of an SUI will occur within the cluster. In some embodiments, it may be desirable to have a plurality of SUIs available. In other embodiments, it may be more appropriate to have only one SUI pregenerated, in order to avoid tying up SAN resources with pre-allocated LUNs. For example, VM management console 2100 generates an SUI appropriate to cluster 2000, by using a random number generator seeded with the current timestamp.

With reference to step 8200 and FIG. 2, one or more LUNs are created in a SAN attached to the virtual machine management console. In some embodiments, the number of SUI's generated in step 8100 correlates to the number of LUNs created in this step; this allows for a one-to-one association of pregenerated SUIs to pregenerated LUNs. In other embodiments, fewer LUNs may be needed, e.g., in situations where LUNs can be shared between virtual machines. In other embodiments, additional LUNs may be needed, e.g., in situations where a virtual machine needs access to more than one LUN. In other embodiments, different numbers of LUNs are created. In some embodiments, this step is omitted, e.g., where pre-existing LUNs can be used.

In some embodiments, LUNs can be created, or caused to be created, by the virtual machine management console. In other embodiments, LUNs are created by other entities, e.g., a SAN administrative controller. For example, VM management console 2100 instructs disk array 3100 to create a new LUN, LUN 3040.

With reference to step 8300 and FIG. 2, LUN masking is performed, to associate an unused SUI with a LUN. In some embodiments, each unused SUI is associated with a new, unused LUN. In other embodiments, an unused SUI can be associated with an already existing LUN. In other embodiments, a combination of these is utilized, e.g., an SUI is associated with a new LUN, and also is allowed to access an existing, shared, LUN. In some embodiments, LUN masking can be performed by the virtual machine management console. In other embodiments, LUN masking is performed by other entities. For example, VM management console 2100 performs LUN masking to associate the new SUI with LUN 3040.

With reference to step 8400 and FIG. 2, an unused SUI is assigned to a newly created virtual machine. In some embodiments, this allows a freshly created virtual machine to be assigned an SUI, complete with associated LUN masking already in place, without needing to generate a new SUI or perform additional LUN masking during or after virtual machine creation. For example, when virtual machine 2200 is created, VM management console 2100 can assign the new SUI, already associated with LUN 3040, to VM 2200.

With reference to step 8500 and FIG. 2, the SUI is released, when no longer needed by the virtual machine. In some embodiments, when a virtual machine is deleted, its associated SUI becomes available for reuse. In some of these embodiments, the SUI is already allowed appropriate SAN access, e.g., via LUN masking. In other embodiments, new LUN masking must be performed before the SUI can be reused. For example, after virtual machine 2200 has been deleted, its SUI returns to a list maintained by VM management console 2100 of unused SUIs. When virtual machine 2250 is created, with the same or similar need for SAN access as VM 2200 had, that SUI can be assigned to VM 2250.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of allowing a virtual machine (VM), executing on a physical node, to access a storage area network (SAN), comprising:
    associating a unique identifier with said VM, wherein said unique identifier differs from other unique identifiers associated with other VMs executing on the physical node; and
    when dynamic unique identifier addressing is supported such that a host bus adapter (HBA) of the physical node is allowed to dynamically use different unique identifiers to access logical unit numbers (LUNs), instructing said physical node to use said unique identifier associated with said VM, rather than a unique identifier associated with said HBA of the physical node, when communicating with a logical unit number (LUN) associated with said VM and stored in said SAN in order to perform an input/output operation for said VM, wherein said LUN is allocated for access to said VM based on the use of the unique identifier and said LUN is not accessible by other VMs with different unique identifiers that are executing on the physical node.

2. The method of claim 1, wherein said SAN comprises a Fibre Channel storage area network.

3. The method of claim 2, wherein said unique identifier comprises a worldwide name (WWN).

4. The method of claim 1, wherein said SAN comprises an Internet small computer system interface (iSCSI).

5. The method of claim 4, wherein said unique identifier comprises an iSCSI initiator name.

6. The method of claim 1, wherein said associating is performed at the time of virtual machine creation.

7. The method of claim 1, wherein said associating is performed after virtual machine creation but before the VM is first loaded into a host.

8. The method of claim 1, wherein said unique identifier is recorded as part of a virtual machine configuration file associated with said VM.

9. A virtual machine cluster, comprising:
    a physical node, configured to host a virtual machine (VM);
    a virtual machine management console, coupled to said physical node, configured to create and manage said virtual machine; and
    a storage area network (SAN), coupled to said physical node, and configured to provide access to a logical unit number block (LUN) associated with said VM,
    wherein said virtual machine management console, upon creation of said VM, assigns a unique identifier to said virtual machine that differs from other unique identifiers associated with other VMs executing on the physical node, and wherein when dynamic unique identifier addressing is supported such that a host bus adapter (HBA) of the physical node is allowed to dynamically use different unique identifiers to access LUNs, said physical node uses said unique identifier, rather than a unique identifier associated with said HBA of the physical node, to provide said virtual machine access to said LUN, wherein said LUN is allocated for access to said VM based on the use of the unique identifier and said LUN is not accessible by other VMs with different unique identifiers that are executing on the physical node.

10. The virtual machine cluster of claim 9, wherein said virtual machine management console determines if said HBA can be dynamically configured to use said unique identifier.

11. The virtual machine cluster of claim 10, wherein said HBA is configured for use with a Fibre Channel SAN, and said unique identifier comprises a worldwide name (WWN).

12. The virtual machine cluster of claim 10, wherein said HBA is configured for use with an Internet small computer system interface (iSCSI), and said unique identifier comprises an iSCSI initiator name.

13. The virtual machine cluster of claim 9, wherein said virtual machine management console is configured to create and manage said other VMs.

14. The virtual machine cluster of claim 13, wherein said physical node uses a particular unique identifier associated with a particular VM, to provide said particular VM access to a particular LUN in the SAN associated with said particular VM.

15. The virtual machine cluster of claim 14, wherein said physical node maintains a virtual machine unique identifier table, for correlating said unique identifiers with said VMs.

16. A non-transitory computer-usable medium having computer-readable program code embodied therein for causing a computer system to execute a method of physical node operation, comprising:
    loading a virtual machine into a physical node, said virtual machine having an associated unique identifier that differs from other unique identifiers associated with other virtual machines executing on the physical node;

when dynamic unique identifier addressing is supported such that a host bus adapter (HBA) of the physical node is allowed to dynamically use different unique identifiers to access logical unit numbers (LUNs), connecting to a storage area network (SAN), using said unique identifier associated with said VM, rather than a unique identifier associated with said HBA of the physical node, in order to perform an I/O action with a logical unit number (LUN) associated with the virtual machine and stored in the SAN, wherein said LUN is allocated for access to said VM based on the use of the unique identifier and said LUN is not accessible by other VMs with different unique identifiers that are executing on the physical node.

17. The non-transitory computer-usable medium of claim 16, further comprising:
determining if said SAN is currently accessible.

18. The non-transitory computer-usable medium of claim 16, further comprising:
determining if the host bus adapter (HBA) used to access said SAN supports dynamic unique identifier addressing.

19. The non-transitory computer-usable medium of claim 16, further comprising:
determining if said SAN supports dynamic unique identifier addressing.

20. The non-transitory computer-usable medium of claim 16, further comprising:
determining if a disk array attached to said SAN supports dynamic unique identifier addressing.

21. The non-transitory computer-usable medium of claim 20, further comprising:
using said unique identifier to access a portion of said disk array associated with said virtual machine, in order to perform a maintenance action.

22. The non-transitory computer-usable medium of claim 16, further comprising:
using said unique identifier to log off of said SAN.

23. A method of virtual machine migration, comprising:
powering down a virtual machine (VM) on a first host system, said virtual machine having an associated unique identifier for accessing a logical unit number block (LUN) on a storage area network (SAN), wherein said LUN is associated with said VM and said unique identifier differs from other unique identifiers associated with other VMs executing on the first host system or a second host system;
loading said virtual machine onto the second host system;
powering on said virtual machine on said second host system; and
when dynamic unique identifier addressing is supported such that a host bus adapter (HBA) of said second host system is allowed to dynamically use different unique identifiers to access LUNs, using said unique identifier, rather than a unique identifier associated with said HBA of the second host system, to access said LUN on said SAN from said second host system, wherein said LUN is allocated for access to said VM based on the use of the unique identifier and said LUN is not accessible by other VMs with different unique identifiers that are executing on the first host system or the second host system.

24. The method of claim 23, further comprising:
updating a VM unique identifier table in said first host system to remove a reference to said unique identifier.

25. The method of claim 23, further comprising:
logging said first host system out of said SAN using said unique identifier.

26. The method of claim 23, further comprising:
updating a VM unique identifier table in said second host system to add a reference to said unique identifier.

27. The method of claim 23, further comprising:
unloading said virtual machine from said first host system.

* * * * *